W. F. RANDOLPH.

Harvester.

No. 9,276. Reissued July 6, 1880.

WITNESSES

Robert Everett

N. Clay Smith.

INVENTOR

Walter F. Randolph.

By Gilmore, Smith & Co.

ATTORNEYS.

THE NORRIS PETERS CO., PHOTO-LITHO., WASHINGTON, D. C.

UNITED STATES PATENT OFFICE.

WALTER F. RANDOLPH, OF BEDFORD, IOWA.

HARVESTER.

SPECIFICATION forming part of Reissued Letters Patent No. 9,276, dated July 6, 1880.

Original No. 155,256, dated September 22, 1874. Application for reissue filed March 15, 1879.

*To all whom it may concern:*

Be it known that I, WALTER F. RANDOLPH, of Bedford, Taylor county, Iowa, have invented a new and useful Improvement in Harvesters, of which the following is a specification.

Figure 1:
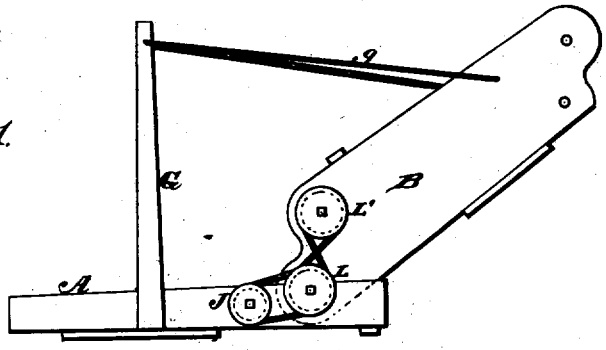
Figure 2:
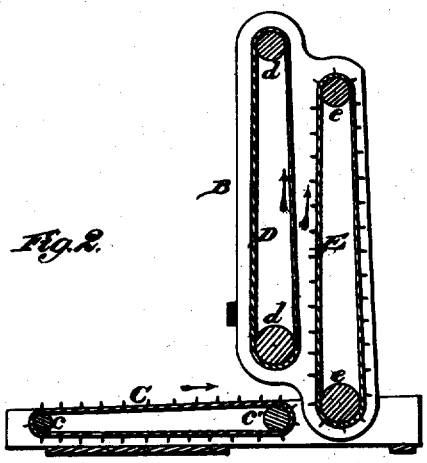

Figure 1 of the drawings is a representation of a side view of my device, and Fig. 2 is a sectional view of the same.

The invention consists of a hinged adjustable elevator-frame having elevating-aprons independent of the platform-apron, and of shafts for operating the aprons provided with pulleys and arranged relatively one to the other in such a manner that the tension of the bands by which the pulleys are connected and driven will not be affected by the various adjustments to which the elevator-frame may be subjected, as will be hereinafter fully described, and particularly pointed out in the claims.

The following is a description of my improvements.

In the annexed drawings, A represents the frame of the grain-platform, to one end of which an elevator-frame, B, is hinged, and connected by a rope or chain, *g*, to a post, G, rising from the rear part of the frame A. The rope or chain *g* sustains the frame B, at whatever angle it may be adjusted, in the ordinary way.

C represents an endless apron, which is applied around two rollers, *c c'*, and arranged in rear of the cutting apparatus, so as to receive upon it the grain as it is cut. This apron is moved in the direction indicated by the arrow in Fig. 2, and delivers the grain between two endless aprons, D E, at their lower ends. The apron E is applied around two rollers, *e e*, and revolved in the direction indicated by the arrow in Fig. 2, and the apron D is applied around two rollers, *d d*, and revolved in the direction indicated by the arrow in said figure.

The three rollers *c' d, e*, nearest the joint of the frame B with frame A, have pulleys J L L' keyed on their shafts, around which bands are passed, as shown in Fig. 1. The shaft *c'* and the lower shaft *e* are journaled in the frame A, and the lower roller *d* is journaled in the adjustable frame B.

The band which connnects the pulleys L and L' is crossed in order to give the inside surfaces of the aprons D and E the same direction.

The lower roller *e* is located at the joint between the frame A and the frame B, and the lower roller *d* is placed in the frame B, and describes the arc of a circle with relation to the axis of the lower roller *e* when the frame B is adjusted, thereby always maintaining the tension of the bands by which the pulleys are connected—that is to say, the tension of these bands is neither increased nor lessened by adjusting the frame B.

Motion is given to the pulley L by means of a belt applied to a pulley on the draft-frame.

In practice I shall apply teeth on the endless aprons C E, and, if desired, teeth may be applied on the apron D.

It will be seen from the above description that the grain is delivered by the apron C between the aprons D E, which elevate it to the highest point of the frame B and discharge it therefrom into a wagon or other suitable receptacle.

The apron D not only assists the apron E in raising the grain, but it also operates as a guard to prevent grain from being blown off of this apron while being raised.

What I claim as new, and desire to secure by Letters Patent, is—

1. The adjustable elevator-frame B, having elevator-aprons D E, independent of the platform-apron C, hinged to the main platform A on the journals of lower elevator-roller *e*, and the aprons operated by means of belts and pulleys, or their equivalents, substantially as and for the purpose described.

2. In a harvester, the roller *c'* of the platform-apron, journaled in the frame A, and the lower roller *e* of the apron E, journaled in the same frame, in combination with the lower roller *d* of the apron D, journaled in the adjustable elevator-frame B, and the bands connecting the pulleys J L L', whereby the tension of the bands connecting and driving the same is neither increased nor diminished by the adjustment of the elevator-frame B, as set forth.

3. In combination with the grain-platform of a harvester having an apron, C, a hinged adjustable elevator-frame, B, having two grain-elevator aprons, D E, which receive the grain between them from the platform-apron, and which may be adjusted at different angles of elevation by adjustment of the hinged frame in which they are carried, substantially as and for the purpose specified.

In testimony that I claim the above I have hereunto subscribed my name in the presence of two witnesses.

WALTER F. RANDOLPH.

Attest:
JOHN J. SCHNEIDER,
A. S. MEEK.